3,210,092
PIVOTAL WHEEL SUSPENSION FOR
MOTOR VEHICLES
Ludwig Kraus, Stuttgart-Sillenbuch, Germany, assignor to Daimler-Benz Aktiengesellschaft, Stuttgart-Unterturkheim, Germany
Filed Aug. 5, 1963, Ser. No. 300,010
1 Claim. (Cl. 280—124)

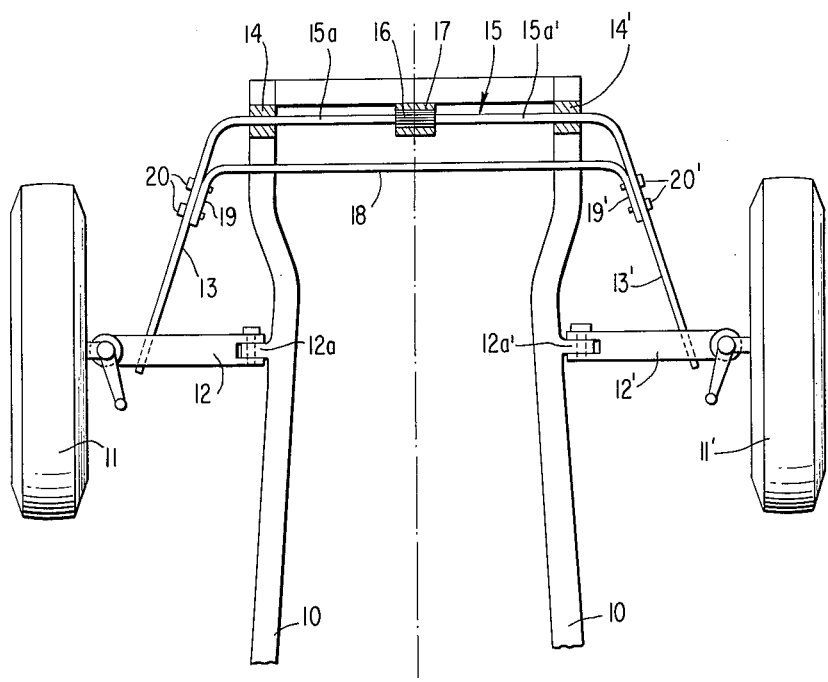

The present invention relates to a wheel suspension for motor vehicles wherein each wheel of a pair of oppositely arranged wheels is swingably or pivotally connected with a part of the vehicle superstructure such as the frame or vehicle body, by means of at least one guide member, and wherein, aside from the main spring suspension system supporting the wheel against the vehicle superstructure, a stabilizer is provided which springily supports or cushions the guide members of the two wheels against each other during relative movements in the stroke thereof.

The present invention resides essentially in that each of the guide members is supported transversely to the plane of oscillation thereof by a supporting arm portion pivotally or hingedly connected to the vehicle superstructure and in that a stabilizer is rigidly secured to the supporting arms outside the hinged connection thereof. In this arrangement, the guide members are provided as transverse guide members, and the supporting arm portions are provided as longitudinally-directed thrust or push arms swinging or oscillating about a transverse vehicle axis.

In comparison with other known prior art constructions, the present invention has the advantage of a particular simple and inexpensive structural design. In particular, no separate bearing or supporting elements on the vehicle superstructure are required for the stabilizer. On the other hand, the stabilizer may be reliably and safely connected to the wheel suspension. The latter is accomplished in an especially advantageous manner in that the stabilizer is laterally connected to the supporting arm portions as a torsion rod by means of the bent ends of the suspension rod element forming the supporting arm portions. At the same time, the spring suspension rod element is also formed by a single angular, particularly U-shaped, rod provided within the axis of oscillation of the supporting arm and, preferably simultaneously, forming also the supporting arm or arms as mentioned.

If desired, the stabilizer may also be disposed within the axis of oscillation of the supporting arms and the main spring suspension element may be formed by torsion rods laterally connected to the supporting arms; however, the provision of the main spring element within the axis of oscillation of the supporting arms affords the advantage that merely torsional forces have to be absorbed on the point of clamping engagement of the main spring suspension element on the vehicle superstructure.

Accordingly, it is a principal object of the present invention to provide an improved suspension system for automobiles.

It is a further object of the present invention to provide a reliable and safe suspension system for a pair of oppositely disposed vehicle wheels.

An additional object of the present invention is the provision of a simple automobile suspension system including a main suspension element formed as a U-shaped rod element and a stabilizer interconnected between the arms of the main suspension element.

These and other objects, features and advantages of the present invention will become more obvious from the following description when taken in connection with the accompanying drawing which shows, for purposes of illustration only, one embodiment in accordance with the present invention wherein the single figure thereof is a top plan view of the arrangement according to the present invention.

Referring now to the drawing, and more particularly to the single figure thereof, reference numerals 11 and 11' designate therein the steerable or controllable front wheels suspended on a vehicle frame 10, for example by means of two transverse guide members each, provided one above the other in the manner of a guide member quadrangle. Only the lower guide member for each wheel, 12 and 12', respectively, which members 12 and 12' are hingedly connected to the vehicle frame at 12a and 12a', respectively, has been illustrated in the drawing for sake of clarity. Each guide member 12 and 12', respectively, is supported against the frame by an essentially longitudinally-directed supporting arm 13 and 13', respectively. It serves preferably for receiving the thrust forces and/or the torsional moments and may be rigidly secured to the transverse guide members 12 and 12', respectively, or may also, for example, only be entrained by the transverse guide member in the direction of spring action or deflection of the wheel and accordingly be hingedly connected therewith, for example, or connected therewith by means of an intermediate tongue member, or the like. Particularly in the first-mentioned case, the transverse guide member is preferably hingedly connected to the vehicle frame in rubber sleeves, or bushings, at 12a and 12a', respectively. The longitudinally-directed supporting arms 13 and 13' are formed, for example, as flat parts or sections of a rod which has a generally U-shaped configuration as a whole and which is laterally positioned in bearings 14 and 14' at the forward end of the frame 10 in such a manner that it may rotate on the vehicle frame about an axis extending transversely to the direction of travel of the motor vehicle the U-shaped rod simultaneously forms a torsion rod spring 15, the latter effecting the main spring suspension or deflection and being, for example, rigidly clamped at 17 in the vertical central longitudinal plane of the vehicle by means of a grooved part 16. The U-shaped rod, therefore, consists of the two rod halves 15a and 15a'.

Moreover, in accordance with the present invention, a torsion rod 18, which serves as a stabilizer, is connected with the supporting arms 13 and 13'. The torsion rod 18 is bent in a U-shaped configuration similarly to the rod which forms the supporting arms 13, 13' and the torsion rod 15 and, with the bent ends 19, 19' thereof, is connected laterally to the supporting arms, for example, by means of the two screws 20, 20' or by riveting, welding, or the like.

If both wheels 11 and 11' are under spring action in the upward direction, for example when driving over a log on the ground, merely the main springs 15a and 15a' will be torsionally stressed, whereas the torsion rod 18, acting as a stabilizer, will remain unaffected thereby. If, however, the wheels execute stroke movements directed oppositely with respect to each other, for example, when driving through curves, these movements will be counteracted not only by the main springs 15a and 15a', but also by the stabilizer 18 due to torsional stress, whereby the forces occurring thereon are absorbed by the supporting arms 13 and 13' via the screws 20, 20' or other connecting elements. Depending upon the length of the bent ends 19, 19' and, respectively, depending upon the distance of the connecting elements 20, 20', the torsional and/or bending forces or stresses arising on the connecting point between the stabilizer 18 and the supporting arm 19, 19' may be maintained very small. The distance between the two torsional springs 15 and 18 is suitably chosen as small as possible.

The main springs 15a and 15a' as well as the stabilizer 18 are thus connected with the guide members 12 and 12' exclusively by the longitudinally effective supporting arms 13, 13'. If desired, the torsion rod 15 may also be provided without a central clamping portion 16, 17, and the torsion rod 18 may instead be clamped in the center thereof in a manner similar to the clamping of portion 16 of rod 15 in the drawing. In this case, the torsion rod, positioned in the bearings 14, 14', would serve as the stabilizer, and the torsion rod 18 as main spring. Furthermore, the torsion rod 18 and, respectively, the stabilizer may, in all instances, form a common correspondingly bent rod with the supporting arms 13, 13', while the torsion rod 15 and, respectively, the main springs are connected to the U-shaped rod in a manner similar to the stabilizer referred to in the embodiment given illustrated in the drawing. Also, the main springs 15a and 15a' may, in all instances, be formed as separate units, if desired together with the supporting arms respectively coordinated thereto. The rods 15 and 18 have suitably a circular cross-section but may also have a flat cross section, in particular the rod 18 which acts as stabilizer.

In a specific mode of construction or embodiment, the guide member may also swing or oscillate about a horizontal transverse axis as a longitudinally-directed thrust guide member. In that case, the supporting arm 13 or 13', respectively, may be directly attached to the guide member and, respectively, form such guide member, whereby the wheel may be guided, for example, by two guide members provided and arranged one above the other and swinging in longitudinal planes, or by one horizontally- and one vertically-swinging or oscillating guide member.

While I have shown and described one embodiment in accordance with the present invention, it is understood that the same is not limited thereto, but is susceptible of numerous changes and modifications within the spirit and scope thereof as known to a person skilled in the art, and I therefore do not wish to be limited to the details shown and described herein, but intend to cover all such changes and modifications as are encompassed by the scope of the appended claim.

I claim:

A wheel suspension for vehicles, especially motor vehicles, having a pair of oppositely disposed wheels, comprising means pivotally connecting said wheels with the vehicle superstructure including at least one guide member for each of said wheels supported on said vehicle superstructure for movement about an axis extending longitudinally of said superstructure, and integrally constructed main spring means including a supporting arm for each of said guide members rigidly supported at each guide member and extending transversely to the plane of oscillation thereof and hingedly connected to said vehicle superstructure for pivoting about an axis of oscillation extending transversely to the direction of travel of the vehicle, and a stabilizer for springily supporting said pair of oppositely disposed wheels against each other during relative stroke movements thereof, said main spring means also including a torsion rod having a rectilinear portion, said stabilizer also being in the form of a torsion rod having a rectilinear portion, the said rectilinear portion of the said main spring torsion rod being arranged within said axis of oscillation and the said rectilinear portion of the said stabilizer torsion rod being arranged at relatively small distances from said axis of oscillation and from the said rectilinear portion of the said main spring torsion rod, said rectilinear portions being substantially parallel with each other and being respectively connected with said supporting arms for entrainment in the direction of oscillation, the said stabilizer torsion rod having bent ends and being essentially U-shaped, said bent ends being rigidly connected to said supporting arms outside said axis of oscillation, the middle part of said rectilinear portion of said main spring torsion rod being clamped to said vehicle superstructure in the central longitudinal plane of the motor vehicle and effecting the main spring action of said vehicle wheels.

References Cited by the Examiner

UNITED STATES PATENTS

| 2,254,261 | 9/41 | Best | 280—124 |
| 2,660,449 | 11/53 | McPherson | 267—11 X |
| 2,768,002 | 10/56 | Rabe | 267—11 X |
| 2,950,774 | 8/60 | Eyb | 280—124 X |
| 3,033,587 | 5/62 | Perish | 280—124 X |

FOREIGN PATENTS

| 1,052,389 | 9/53 | France. |
| 369,790 | 2/23 | Germany. |

A. HARRY LEVY, *Primary Examiner.*

LEO FRIAGLIA, *Examiner.*